(12) United States Patent
Igawa

(10) Patent No.: US 11,840,934 B2
(45) Date of Patent: Dec. 12, 2023

(54) CASING DEFORMATION AMOUNT MEASURING APPARATUS AND CASING DEFORMATION AMOUNT MEASURING METHOD

(71) Applicant: MITSUBISHI HEAVY INDUSTRIES, LTD., Tokyo (JP)

(72) Inventor: Hiroshi Igawa, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 5 days.

(21) Appl. No.: 17/886,311

(22) Filed: Aug. 11, 2022

(65) Prior Publication Data

US 2023/0052054 A1 Feb. 16, 2023

(30) Foreign Application Priority Data

Aug. 16, 2021 (JP) ................................. 2021-132411

(51) Int. Cl.
*F01D 21/00* (2006.01)
*F01D 25/24* (2006.01)
(52) U.S. Cl.
CPC ......... *F01D 21/003* (2013.01); *F01D 25/243* (2013.01); *F05D 2220/31* (2013.01);
(Continued)
(58) Field of Classification Search
CPC .. F01D 21/003; F01D 25/243; F05D 2220/31; F05D 2240/14; F05D 2260/31; F05D 2260/80; F05D 2270/821
(Continued)

(56) References Cited

U.S. PATENT DOCUMENTS 5,238,366 A * 8/1993 Ferleger ................ G01B 5/205
416/61
9,683,454 B1 6/2017 Welch et al.
(Continued)

FOREIGN PATENT DOCUMENTS

JP S58-42303 U 3/1983
JP 2001-201321 A 7/2001
(Continued)

OTHER PUBLICATIONS

Office Action dated Jun. 20, 2023, issued in counterpart JP Application No. 2021-132411, with English translation. (10 pages).

*Primary Examiner* — Hoang M Nguyen
(74) *Attorney, Agent, or Firm* — WHDA, LLP

(57) ABSTRACT

Provided is a casing deformation amount measuring apparatus for a steam turbine including a casing, a plurality of nuts fixed to an outer surface of the casing, a plurality of bolts individually screwed, at each one side end portion thereof, in the nuts and projecting to an outer side in a diametrical direction of the casing from the outer surface of the casing, and a lagging material held by the plurality of bolts and covering the casing. The casing deformation amount measuring apparatus includes a target mounted on another side end portion of one of the bolts and exposed to the outer side in a diametrical direction of the casing with respect to the lagging material, and a distance meter that is disposed in an opposing relation to the target on the outer side in a diametrical direction of the casing and measures a distance to the target.

5 Claims, 6 Drawing Sheets

(52) U.S. Cl.
CPC ...... *F05D 2240/14* (2013.01); *F05D 2260/31* (2013.01); *F05D 2260/80* (2013.01); *F05D 2270/821* (2013.01)

(58) Field of Classification Search
USPC .......................................................... 415/118
See application file for complete search history.

(56) References Cited

U.S. PATENT DOCUMENTS

| | | | | |
|---|---|---|---|---|
| 2008/0310949 | A1* | 12/2008 | Kondo .................... | F01D 25/08 |
| | | | | 415/47 |
| 2010/0241393 | A1* | 9/2010 | Ihara ...................... | G01B 21/24 |
| | | | | 702/150 |
| 2014/0003905 | A1* | 1/2014 | Delvaux ............... | F01D 21/003 |
| | | | | 415/118 |
| 2019/0107007 | A1* | 4/2019 | Yashirodai .............. | G06F 30/23 |

FOREIGN PATENT DOCUMENTS

| | | |
|---|---|---|
| JP | 2013-174451 A | 9/2013 |
| JP | 2017-150854 A | 8/2017 |
| JP | 2019-526008 A | 9/2019 |

* cited by examiner

CASING DEFORMATION AMOUNT MEASURING APPARATUS AND CASING DEFORMATION AMOUNT MEASURING METHOD

BACKGROUND OF THE INVENTION

1. Field of the Invention

The present invention relates to a casing deformation amount measuring apparatus and a casing deformation amount measuring method for measuring the deformation amount of a casing of a steam turbine in a diametrical direction.

2. Description of the Related Art

In order to avoid contact between a casing and a rotor of a steam turbine, it is necessary to monitor the deformation of the casing during operation of the steam turbine. As a technology of this type described, a technology is known in which a thermometer is passed through a bolt attached to the outer surface of a casing to hold a lagging material covering the casing, and deformation of the casing is computed from the temperature of the outer surface of the casing that is measured by the thermometer (JP-2013-174451-A).

PRIOR ART DOCUMENT

Patent Document

Patent Document 1: JP-2013-174451-A

However, there is the possibility that the deformation amount of a casing computed from the temperature may suffer from an error between the computed value and an actual value depending upon a condition. Where a deformation amount is computed from the temperature, complicated analysis in which a linear expansion coefficient, a shape, and so forth of the casing are taken into consideration is required and also the computation load is heavy. Further, since the casing deformation amount measuring apparatus of JP-2013-174451-A has such a special structure in which the thermometer is passed through the bolt that holds the lagging material, application of the casing deformation amount measuring apparatus to an existing steam turbine requires manpower. Therefore, it is difficult for the casing deformation amount measuring apparatus to rapidly cope with such a case where actual measuring of the deformation of the casing is intended in order to investigate the cause of the defect when an existing steam turbine suffers from some defect.

SUMMARY OF THE INVENTION

It is an object of the present invention to provide a casing deformation amount measuring apparatus and a casing deformation amount measuring method that can directly measure the deformation amount of a casing of a steam turbine and can be applied readily to an existing steam turbine.

In order to achieve the object described above, according to the present invention, there is provided a casing deformation amount measuring apparatus for a steam turbine including a casing, a plurality of nuts fixed to an outer surface of the casing, a plurality of bolts individually screwed, at each one side end portion thereof, in the nuts and projecting to an outer side in a diametrical direction of the casing from the outer surface of the casing, and a lagging material held by the plurality of bolts and covering the casing. The casing deformation amount measuring apparatus includes a target mounted on another side end portion of one of the bolts and exposed to the outer side in a diametrical direction of the casing with respect to the lagging material, and a distance meter that is disposed in an opposing relation to the target on the outer side in a diametrical direction of the casing and measures a distance to the target.

According to the present invention, the casing deformation amount measuring apparatus can directly measure the deformation amount of the casing of the steam turbine and can be applied readily to an existing steam turbine.

DESCRIPTION OF THE PREFERRED EMBODIMENTS

In the following, embodiments of the present invention are described with reference to the accompanying drawings.

First Embodiment

—Steam Turbine—

Figure 1:
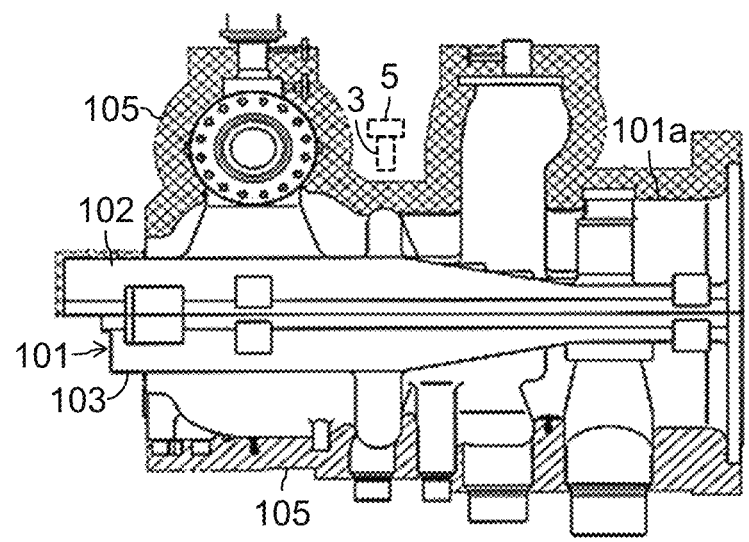
FIG. 1 is a side elevational view of an appearance of an example of a steam turbine to which a casing deformation amount measuring apparatus according to a first embodiment of the present invention is applied.
Figure 2:
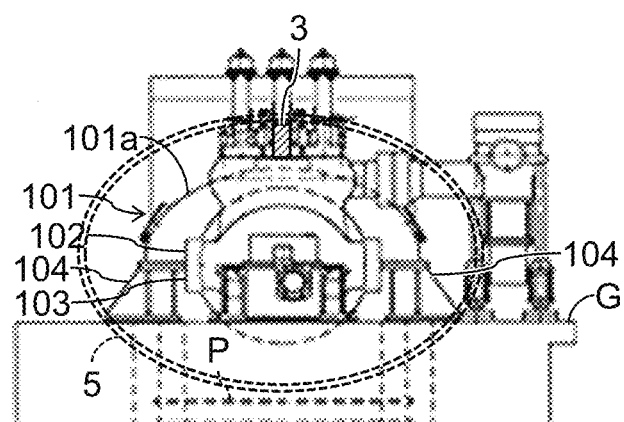
FIG. 2 is a view of the steam turbine of FIG. 1 as viewed from the left side in FIG. 1.

FIG. 1 is a side elevational view of an appearance of an example of a steam turbine to which a casing deformation amount measuring apparatus according to a first embodiment of the present invention is applied, and FIG. 2 is a view of the steam turbine of FIG. 1 as viewed from the left side in FIG. 1. In FIG. 1, a lagging material (heat insulating material) 105 that covers a casing 101 is represented in section. In FIG. 2, the lagging material 105 is omitted, and instead, a supporting structure for the casing 101 is depicted.

As depicted in FIGS. 1 and 2, the casing 101 of the steam turbine in which a turbine rotor (not depicted) is accommodated is upwardly and downwardly divided into two divisional casings of an upper half casing 102 and a lower half casing 103 and is supported on the ground surface G with a frame 104 as depicted in FIG. 2. FIG. 2 depicts a configuration in which the lower half casing 103 is partly accommodated in a pit P dug down from the ground surface G. The casing 101 is covered at an outer surface 101a thereof with the lagging material 105 such that it is kept warm during operation of the steam turbine.

Figure 3:
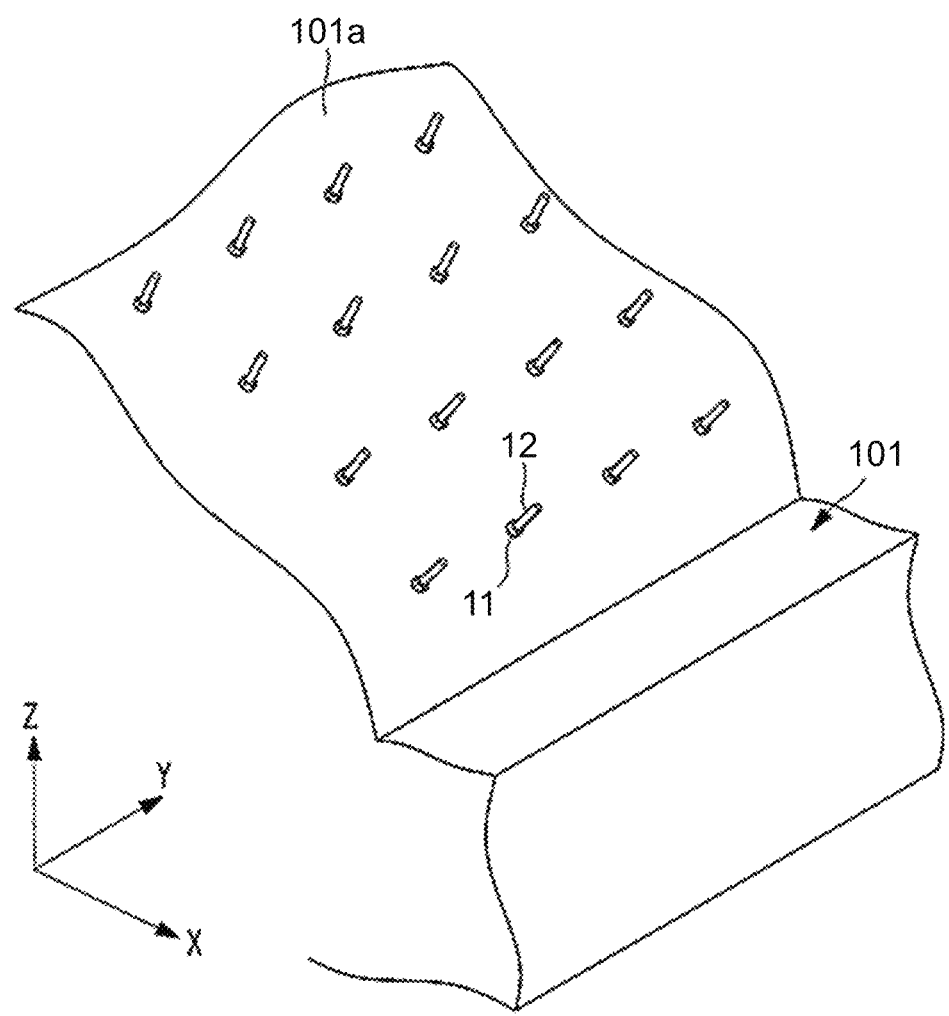
FIG. 3 is an explanatory diagram of a holding structure for a lagging material.
Figure 4:
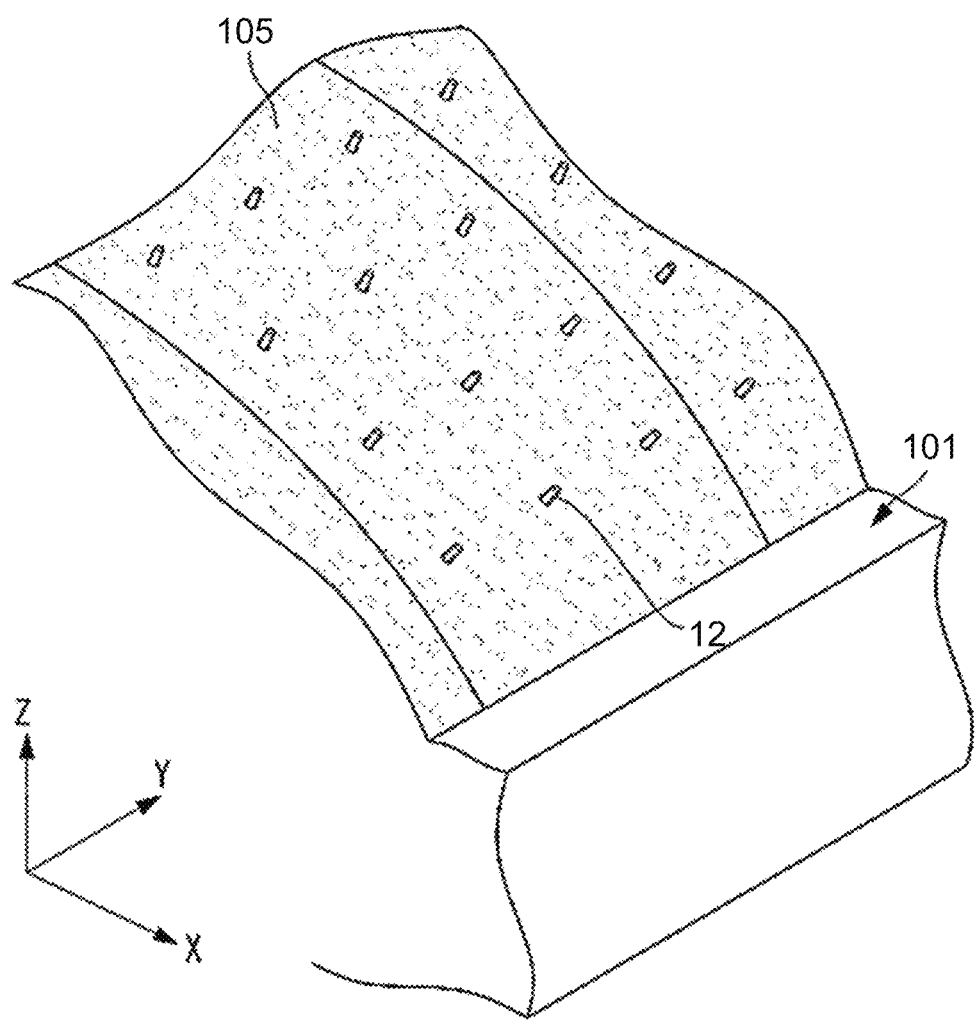
FIG. 4 is an explanatory diagram of the holding structure for a lagging material.

FIGS. 3 and 4 are explanatory diagrams of a holding structure for the lagging material 105. As depicted in FIG. 3, a plurality of nuts 11 are fixed by welding to the outer surface 101a of the casing 101. The nuts 11 are arranged at predetermined intervals (for example, at 300 mm pitch) in an axial direction (Y direction) and a circumferential direction of the casing 101. A bolt 12 is mounted on each nut 11. The bolt 12 is screwed at one side end portion thereof in the nut 11 and projects to the outer side in a diametrical direction of the casing 101 from the outer surface 101a of the casing 101 such that it stands with the other side end face thereof directed to the outer side in a diametrical direction of the casing 101. The bolt 12 extends in a normal direction to the outer surface 101a of the casing 101. It is to be noted that, although the bolt 12 can be formed using a double-sided bolt, the bolt 12 in the present embodiment is formed using a bolt having a head portion 12a (FIG. 5) (for example, a hexagon bolt).

The lagging material 105 has a predetermined thickness and covers the outer surface 101a of the casing 101 such that it closely contacts at an inner circumferential face thereof with the outer surface 101a of the casing 101. For the lagging material 105, a material that is superior in heat insulating property such as a bio-soluble fiber or a ceramic fiber is used. The lagging material 105 is held by a large number of bolts 12 projecting from the outer surface 101a of the casing 101. The bolts 12 described above extend through the layer of the lagging material 105 and project at the other side end portion thereof from the outer surface of the lagging material 105.

Figure 5:
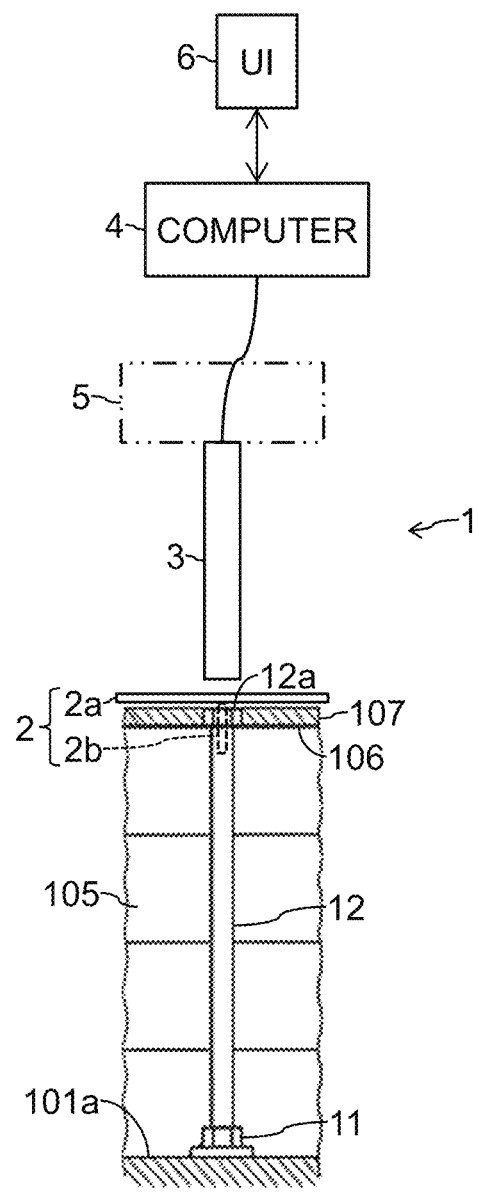
FIG. 5 is a schematic view of the casing deformation amount measuring apparatus.

It is to be noted that the outer surface of the lagging material 105 (FIG. 5) is covered with a lath (wire net) 106 (FIG. 5) and is held down from the outer side by the lath 106. The lath 106 is further covered on the outer side thereof with a cover 107 (FIG. 5). The other side end portion, described above, of the bolts 12 extends through the lath 106 and the cover 107 such that they are exposed to the outer surface of the cover 107.

—Casing Deformation Amount Measuring Apparatus—

FIG. 5 is a schematic view of the casing deformation amount measuring apparatus. The casing deformation amount measuring apparatus 1 depicted in FIG. 5 is an apparatus that measures the deformation amount of the casing 101 of the steam turbine and includes a target (target plate) 2, a distance meter 3, and a computer 4.

The target 2 is configured from a disk portion 2a and a screw portion 2b extending from the center of the disk portion 2a. The disk portion 2a has a smooth surface provided by a member in the form of a plate of a circular shape that is a measurement target of the distance meter 3. It is to be noted that the disk portion 2a can be substituted by a plate member of a shape other than a circular shape (for example, of a quadrangular shape). The screw portion 2b projects in a direction orthogonal to the surface of the disk portion 2a from the center of a rear face of the disk portion 2a, namely, of a face on the opposite side to the surface that is to be measured by the distance meter 3. The screw portion 2b has a nominal diameter smaller than the nominal diameter of the bolt 12.

When the target 2 is to be mounted on the bolt 12, a threaded hole is machined at the other side end portion of the bolt 12 along the center line of the bolt 12, and the screw portion 2b of the target 2 is screwed into the threaded hole of the bolt 12. Consequently, the target 2 is mounted in a posture in which the surface thereof is orthogonal to the center line of the bolt 12. The surface of the target 2 is exposed to the outer side in a diametrical direction of the casing 101 with respect to the lagging material 105 and the cover 107 and is directed to the outer side in a diametrical direction of the casing 101. The surface of the target 2 is wider than the other side end face of the bolt 12 such that, even if the casing 101 is deformed to bring the centers of the target 2 and the distance meter 3 out of alignment with each other, the optical axis of a laser beam of the distance meter 3 or the orientation axis of an ultrasonic wave is less likely to be displaced from the surface of the target 2.

It is to be noted that, although the configuration for fixing the target 2 to the bolt 12 by a screw is adopted in the present embodiment, the target 2 may be attached to the bolt 12 by some other method such as a magnet, a bonding agent, or welding.

The distance meter 3 is a laser or ultrasonic non-contact distance meter and is arranged in an opposing relation to the surface of the target 2 on the outer side in a diametrical direction of the casing 101 such that it measures the distance to the target 2. The distance meter 3 is supported, for example, on the ground surface G or a structure such as the frame 104 separately from the casing 101 by a support 5. In the present embodiment, the support 5 is exemplified which has a ring shape surrounding the outer periphery of the casing 101 (FIG. 2). However, the configuration of the support 5 can be changed suitably only if the distance meter 3 can be fixed to a desired position separately from the casing 101. The distance meter 3 is fixed to the support 5 in such a posture that, for example, in a state in which the casing 101 is cooled to a room temperature, the optical axis of a laser beam or the orientation axis of an ultrasonic wave is orthogonal to the surface of the target 2 at the center of the surface.

It is to be noted that, although, in the present embodiment described above, the distance meter 3 of the contactless type is adopted, it is possible to alternatively adopt a distance meter of the contact type such as a dial gage.

The computer 4 is connected to the distance meter 3 and computes the distance between the target 2 and the distance meter 3 on the basis of an output of the distance meter 3. The computer 4 not only can merely compute the distance between the target 2 and the distance meter 3 but also can compute a deformation amount of the casing 101 on the basis of the computed distance.

A user interface 6 is connected to the computer 4 such that, for example, a calculation result of the computer 4 can be confirmed on the user interface 6. Although the computer 4 and the user interface 6 can be installed alongside the steam turbine (for example, on the ground surface G), they may otherwise be installed, for example, in a control room for controlling the operation condition of the steam turbine. The user interface 6 is a generic name not only of outputting devices such as a monitor and a printer that output data from the computer 4 but also of inputting devices such as a keyboard and a mouse that input data to the computer 4 and like devices.

For example, by inputting an output of the distance meter 3 to the computer 4, a warning about deformation of the casing 101 can be conveyed to an operator through the user interface 6. For example, it is possible for the computer 4 to compute the magnitude of a gap between the casing 101 and the turbine rotor on the real time basis on the basis of a deformation amount of the casing 101 measured by the distance meter 3 during operation of the steam turbine and output a warning if the magnitude of the gap is smaller than a preset value.

In the present embodiment, the target 2 is mounted on only one bolt 12 that is positioned, for example, at an upper portion of the upper half casing 102 and has the other side end face directed upwardly (in other words, the surface of the target 2 mounted is directed upwardly). More particularly, the bolt on which the target 2 is mounted can be selected preferably from among those bolts 12 that are provided along a vertical plane including the center line of rotation of the turbine (or provided most closely to the vertical plane) and are positioned corresponding to a high pressure stage (for example, the first to second stages of the turbine) on the upper half side of the casing 101. Accordingly, in the present embodiment, a totaling one set of the target 2 and the distance meter 3 is provided for a single bolt 12 whose other side end face is directed upwardly from among a large number of bolts 12.

—Casing Deformation Amount Measuring Method—

Where the deformation amount of the casing 101 of an existing steam turbine is measured using the casing deformation amount measuring apparatus 1, the target 2 is mounted first on the other side end portion of a bolt 12 such that it is exposed to the outer side in a diametrical direction of the casing 101 with respect to the lagging material 105 and the cover 107. Thereafter or concurrently, the support 5 is installed suitably. Then, the distance meter 3 is installed on the support 5 such that it is opposed to the target 2 on the outer side in a diametrical direction of the casing 101, and the distance meter 3 is connected to the computer 4. The installation works of the target 2 and the distance meter 3 are performed in a state in which the steam turbine is cooled to an approximately normal temperature. During such works, there is no necessity to remove the lagging material 105 or the cover 107, and the works are performed while the lagging material 105 and the cover 107 remain attached to the casing 101. After the preparations described are made, operation of the steam turbine is started, and the deformation amount of the casing 101 in a diametrical direction is measured on the basis of data of the distance between the distance meter 3 and the target 2 outputted from the distance meter 3 during the operation.

It is to be noted that, although it is possible to remove the target 2 and the distance meter 3 after the measurement and then set the target 2 and the distance meter 3 at the time of measurement, it is not necessarily necessitated to remove the target 2 or distance meter 3 set once. The target 2 and the distance meter 3 set once can be used as they are for monitoring of the deformation amount of the casing 101 in later operation of the steam turbine.

Advantageous Effect

The casing 101 thermally expands with steam that flows in the inside thereof during operation of the steam turbine. This thermal expansion amount varies depending upon the steam amount flowing into the casing 101. For example, at the time of starting of the steam turbine, the upper half casing 102 becomes higher in temperature than the lower half casing 103, and the casing 101 is deformed in an upwardly protruding shape due to a temperature difference between them. In contrast, when the load to the steam turbine decreases suddenly, it is predicted that the casing 101 is deformed in a downwardly protruding shape. Generally, since a casing of a steam turbine is covered with a lagging material and deformation of the casing cannot be observed from the outside, conventionally, estimation computation of the deformation amount of the casing is sometimes performed through measurement of the surface temperature of the casing. In this case, since the estimation computation is conversion from a physical quantity of a different category, there is the possibility that the computation accuracy of the deformation amount may degrade depending upon a condition. Further, since a complicated conversion formula is used, the computation load is heavy, and also there is the necessity to apply a special structure for measuring the surface temperature of the casing covered with the lagging material.

In contrast, in the present embodiment, since the target 2 is mounted on an end face of a bolt 12 that holds the lagging material 105 and the distance to the target 2 is measured by the distance meter 3, the displacement amount of the target 2 can be measured. Since the target 2 is fixed to the outer surface 101a of the casing 101 by the bolt 12 and the displacement amount of the target 2 is equivalent to the displacement amount of the outer surface 101a of the casing 101, the deformation amount of the outer surface 101a of the casing 101 can be measured directly by the distance meter 3. Although, since the casing 101 is covered with the lagging material 105, a laser beam or the like cannot be applied to the outer surface 101a, by mounting the target 2 utilizing the bolt 12 that holds the lagging material 105, the displacement of the outer surface 101a of the casing 101 in a diametrical direction can be measured directly. Since no complicated computation is required, also the computation load can be reduced.

For example, where a notification of a situation in which the gap between the turbine rotor and the casing 101 is excessively small, on the basis of a deformation amount of the casing 101, is received through the user interface 6, the operator can flexibly cope with the situation by adjustment of the load condition of the steam turbine or like measures. Further, where the configuration just described is used together with the conventional configuration in which the deformation amount of the casing 101 is computed from a measurement temperature of the outer surface 101a, if the computation value of the deformation amount by the conventional configuration is compared with an actual measurement value by the configuration of the embodiment, then this is useful also for confirmation of the reasonability or adjustment of a computation algorithm.

Further, since the present embodiment adopts the configuration in which the target 2 is mounted on an end face of a bolt 12 and the distance meter 3 opposing to the target 2 is installed, it is easy to install the target 2 and the distance meter 3 and the configuration can be applied readily also to an existing steam turbine. Since retrofitting of the target 2 and the distance meter 3 is easy, it is possible to cope with such a case where monitoring of deformation of the casing 101 is tried to be performed quickly during operation of the steam turbine when some defect occurs with the steam turbine.

Furthermore, since a large number of bolts 12 for holding the lagging material 105 exist in a predetermined pitch in the axial direction and the circumferential direction of the casing 101, also the degree of freedom in selection of a location of the casing 101 to which a set of the target 2 and the distance meter 3 is attached to measure the deformation amount is high. In the description of the present embodiment, the configuration in which the deformation amount of the casing 101 is measured only at one point at an upper portion of the upper half casing 102 is described as an example. Since the upper half casing 102 and the lower half casing 103 are fixed firmly to each other at flange portions thereof by a large number of bolts and therefore are deformed integrally with each other (for example, upwardly protruding or downwardly protruding), if the measurement location is selected appropriately, then the deformation amount of the casing 101 can be measured.

Second Embodiment

Figure 6:
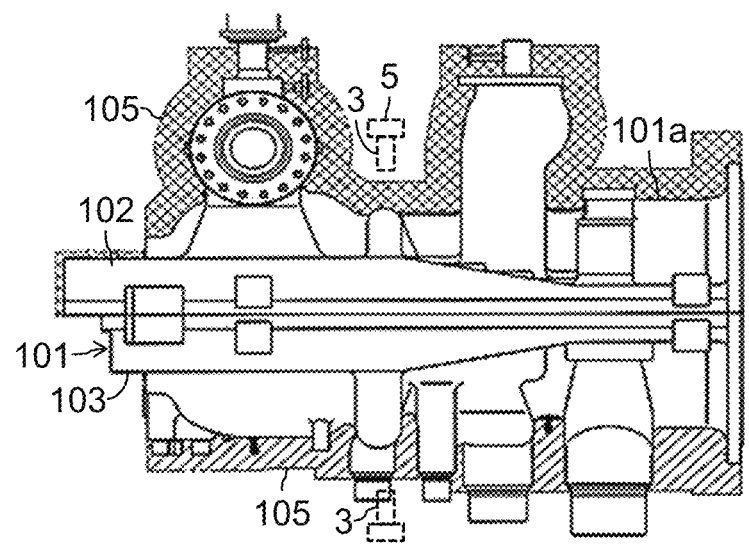
FIG. 6 is a side elevational view of an appearance of an example of a steam turbine to which a casing deformation amount measuring apparatus according to a second embodiment of the present invention is applied.
Figure 7:
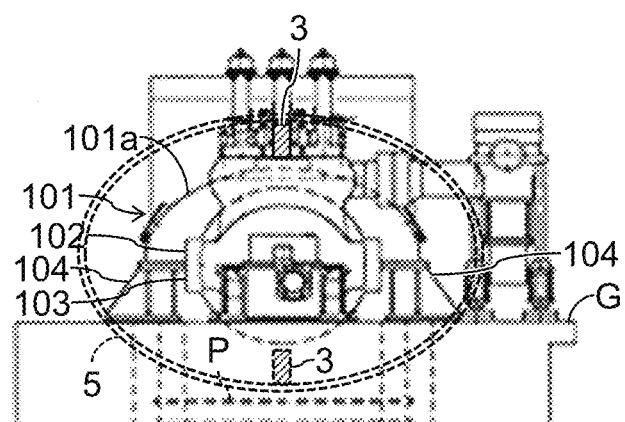
FIG. 7 is a view of the steam turbine of FIG. 6 as viewed from the left side in FIG. 6.

FIG. 6 is a side elevational view of an appearance of an example of a steam turbine to which a casing deformation amount measuring apparatus according to a second embodiment of the present invention is applied, and FIG. 7 is a view of the steam turbine of FIG. 6 as viewed from the left side in FIG. 6. In FIGS. 6 and 7, like elements to those in the first embodiment are denoted by like reference characters in the drawings referred to above and overlapping description of them is omitted. In FIGS. 6 and 7, arrangement of a set of a target 2 and a distance meter 3 is represented by illustration of the distance meter 3 and illustration of the target 2 is omitted.

The present embodiment is different from the first embodiment in that, for one bolt 12 whose other side end face (end face on the opposite side to a nut 11) is directed upwardly and another bolt 12 whose other side end face is directed downwardly from among a plurality of bolts 12, two sets of a target 2 and a distance meter 3 each for each of the two bolts 12 mentioned are provided.

In the present embodiment, from either of the two bolts 12 on which the target 2 is mounted, the first one can be selected from the upper half side of the casing 101 in the same way as the bolt 12 on which the target 2 is mounted in the first embodiment. As the second bolt 12, a bolt 12 that is opposed to the first bolt 12 across the casing 101 can be selected from the lower half side of the casing 101. For example, one bolt 12 that is positioned at a lower portion of the lower half casing 103 and has the other side end face directed downwardly (in other words, the surface of the target 2 to be mounted is directed downwardly) can be selected as the second bolt 12. More particularly, the second bolt can be selected preferably from among those bolts 12 that are positioned along a vertical plane including the center line of rotation of the turbine (or positioned most closely to the vertical plane) and whose positions correspond to a high pressure stage (for example, in the first to second stages of the turbine) on the lower half side of the casing 101. Accordingly, in the present embodiment, totaling two sets of a target 2 and a distance meter 3 are provided for two ones of a large number of bolts 12. Although the installation positions of the two targets 2 may be spaced from each other in the axial direction of the casing 101, in such a case where the positions of them in the axial direction are close to each other in this manner, they can share a single ring-shaped support 5 with each other.

The two distance meters 3 are connected to the same computer 4 or to different computers 4 and individually measure the distance between the distance meters 3 and the corresponding targets 2. What processing is to be executed on the basis of outputs of the distance meters 3 can be changed suitably. For example, such processing as outputting a warning if the minimum value of the gap between the casing 101 and the turbine rotor based on the output of one of the distance meters 3 and the gap between the casing 101 and the turbine rotor based on the output of the other distance meter 3 is lower than a preset value can be executed.

Other details of the casing deformation amount measuring apparatus and the casing deformation amount measuring method are similar to those in the first embodiment and deformation of the casing 101 can be measured on the upper half side similarly as in the first embodiment. Therefore, advantageous effects similar to those obtained by the first embodiment can be obtained. In addition, even if the target 2 is mounted on a bolt 12 of the lower half casing 103 to measure the displacement amount, the deformation amount of the casing 101 can be measured. By measuring the deformation amount of the casing 101 at both of the upper half casing 102 and the lower half casing 103, the accuracy in measurement of the deformation amount of the casing 101 or the measurement accuracy of such deformation can be improved in comparison with the first embodiment.

Third Embodiment

Figure 8:
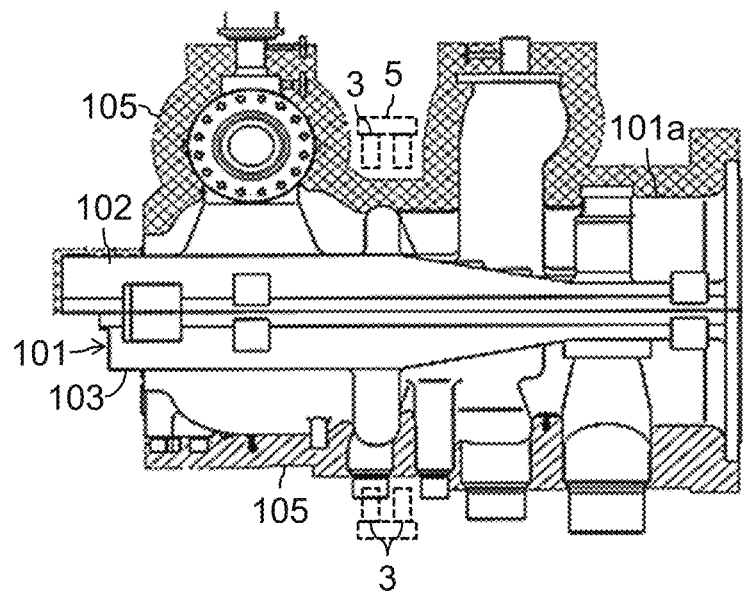
FIG. 8 is a side elevational view of an appearance of an example of a steam turbine to which a casing deformation amount measuring apparatus according to a third embodiment of the present invention is applied.
Figure 9:
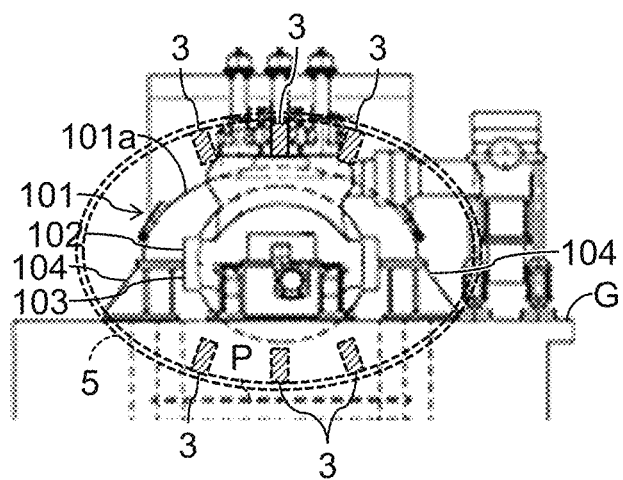
FIG. 9 is a view of the steam turbine of FIG. 8 as viewed from the left side in FIG. 8.

FIG. 8 is a side elevational view of an appearance of an example of a steam turbine to which a casing deformation amount measuring apparatus according to a third embodiment of the present invention is applied, and FIG. 9 is a view of the steam turbine of FIG. 8 as viewed from the left side in FIG. 8. FIGS. 8 and 9 correspond to FIGS. 1 and 2 in the first embodiment, respectively. In FIGS. 8 and 9, like or corresponding elements to those in the first embodiment are denoted by like reference characters applied in the drawings referred to above and overlapping description of them is omitted. Similarly as in FIGS. 6 and 7, in FIGS. 8 and 9, arrangement of a set of a target 2 and a distance meter 3 is represented by illustration of the distance meter 3 while illustration of the target 2 is omitted.

The present embodiment is different from the first embodiment in that one set of a target 2 and a distance meter 3 is provided for each of plural bolts 12 in the axial direction and the circumferential direction of the casing 101 from among a plurality of bolts 12 on each of the upper half casing 102 and the lower half casing 103. Since, as deformation of the casing 101, it is supposed typically that the casing 101 is deformed so as to be protruded upwardly or so as to be protruded downwardly in FIG. 8, FIGS. 8 and 9 exemplify a configuration in which a plurality of sets of a target 2 and a distance meter 3 are arranged in the proximity of an upper end portion and in the proximity of a lower end portion of the casing 101 as viewed in the axial direction. However, such a configuration as just described is not restrictive, and also it is possible to adopt such a configuration that, for example, sets of a target 2 and a distance meter 3 are installed at fixed intervals in the circumferential direction over the overall circumference of the casing 101 in FIG. 9. Also for the arrangement in the axial direction of the casing 101, such a configuration that sets of a target 2 and a distance meter 3 are installed at predetermined intervals over a wider range can be applied.

The distance meters 3 are connected to the same computer 4 or to different computers 4 and individually measure the distance between the distance meters 3 and the corresponding targets 2. For example, such processing as outputting a warning if the gap between the casing 101 and the turbine rotor, based on the output of one of the distance meters 3, is lower than a preset value can be executed.

Other details of the casing deformation amount measuring apparatus and the casing deformation amount measuring method are similar to those in the first embodiment, and advantageous effects similar to those obtained by the first embodiment can be obtained. Further, since the deformation amount of the casing 101 is measured at multiple points, the accuracy in measurement of the deformation amount of the casing 101 or the measurement accuracy of such deformation can be improved in comparison with the first and second embodiments. In addition, by measuring the deformation amount of the outer surface 101a of the casing 101 at multiple points, such deformation amounts can be utilized for more detailed analysis of the shape of the casing 101 before and after the deformation.

DESCRIPTION OF REFERENCE CHARACTERS

1: Casing deformation amount measuring apparatus
2: Target
3: Distance meter
11: Nut
12: Bolt
101: Casing
105: Lagging material

What is claimed is:

1. A casing deformation amount measuring apparatus for a steam turbine including:
    a casing;
    a plurality of nuts fixed to an outer surface of the casing;
    a plurality of bolts individually screwed, at each one side end portion thereof, in the nuts and projecting to an outer side in a diametrical direction of the casing from the outer surface of the casing; and
    a lagging material held by the plurality of bolts and covering the casing,
    the casing deformation amount measuring apparatus comprising:
    a target mounted on another side end portion of one of the bolts and exposed to the outer side in a diametrical direction of the casing with respect to the lagging material; and
    a distance meter that is arranged in an opposing relation to the target on the outer side in a diametrical direction of the casing and measures a distance to the target.

2. The casing deformation amount measuring apparatus according to claim 1, wherein,
    for one bolt whose another side end face is directed upwardly from among the plurality of bolts, totaling one set of the target and the distance meter is provided.

3. The casing deformation amount measuring apparatus according to claim 1, wherein,
    for one bolt whose another side end face is directed upwardly and another bolt whose another side end face is directed downwardly, totaling two sets of the target and the distance meter are provided.

4. The casing deformation amount measuring apparatus according to claim 1, wherein,
    for each of plural bolts in an axial direction and a circumferential direction of the casing from among the plurality of bolts, on each of an upper half side and a lower half side of the casing, one set of the target and the distance meter is provided.

5. A casing deformation amount measuring method for a steam turbine including a casing, a plurality of nuts fixed to an outer surface of the casing, a plurality of bolts individually screwed at each one side end portion thereof in the nuts and projecting to an outer side in a diametrical direction of the casing from the outer surface of the casing, and a lagging material held by the plurality of bolts and covering the casing, the casing deformation amount measuring method comprising:
    mounting a target on another side end portion of one of the bolts so as to be exposed to the outer side in a diametrical direction of the casing with respect to the lagging material;
    installing a distance meter in an opposing relation to the target on the outer side in a diametrical direction of the casing; and
    measuring a distance between the distance meter and the target.

* * * * *